United States Patent
Yoon et al.

(10) Patent No.: US 10,107,160 B2
(45) Date of Patent: Oct. 23, 2018

(54) FLOW ACCELERATING VENTILATION TYPE HEAD COVER AND ENGINE THEREBY

(71) Applicants: Hyundai Motor Company, Seoul (KR); Kia Motors Corporation, Seoul (KR)

(72) Inventors: Seok-Jun Yoon, Anyang-si (KR); Hyun-Wook Ryu, Hwaseong-si (KR); Won-Hyuk Koh, Seoul (KR); Byung-Chul Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/375,642

(22) Filed: Dec. 12, 2016

(65) Prior Publication Data

US 2018/0073404 A1 Mar. 15, 2018

(30) Foreign Application Priority Data

Sep. 9, 2016 (KR) .................. 10-2016-0116418

(51) Int. Cl.
*F01M 11/08* (2006.01)
*F02M 25/06* (2016.01)
*B01D 45/08* (2006.01)

(52) U.S. Cl.
CPC ............. *F01M 11/08* (2013.01); *B01D 45/08* (2013.01); *F02M 25/06* (2013.01)

(58) Field of Classification Search
CPC .... F01M 11/08; F01M 13/04; F01M 13/0416;
F01M 2013/0433; F01M 2013/0438;
F01M 2013/0461; F01M 2013/0488;
B01D 45/08; F02M 25/06
See application file for complete search history.

(56) References Cited

U.S. PATENT DOCUMENTS

| 2012/0312272 A1* | 12/2012 | Kobayashi | ......... F01M 13/0416 |
| | | | 123/196 R |
| 2014/0283689 A1* | 9/2014 | Guerry | ................... B01D 45/08 |
| | | | 95/284 |

FOREIGN PATENT DOCUMENTS

| JP | 2006-250131 A | 9/2006 |
| JP | 2013-113109 A | 6/2013 |
| JP | 2015-031195 A | 2/2015 |
| KR | 10-0777257 B1 | 11/2007 |
| KR | 10-0783888 B1 | 12/2007 |

(Continued)

*Primary Examiner* — Jacob Amick
(74) *Attorney, Agent, or Firm* — Morgan, Lewis & Bockius LLP

(57) ABSTRACT

A flow accelerating ventilation type head cover may include a baffle separating a lower space which is opened such that blow-by gas containing an oil particle generated from an engine is collected thereto and an upper space which is closed such that the blow-by gas is flowed out to an outside of the engine and having a baffle passage communicating the lower space with the upper space such that the blow-by gas is exhausted from the lower space to the upper space therethrough, and a flow accelerating member being coupled with the baffle passage and being positioned in the upper space so as to accelerate a flow speed of the blow-by gas passing through the baffle passage and thus separate the oil particle by collision effect of impacting the oil particle with each other in the upper space.

14 Claims, 7 Drawing Sheets

(56) References Cited

FOREIGN PATENT DOCUMENTS

| KR | 101052771 B1 | 8/2011 |
| KR | 10-1361571 B1 | 2/2014 |
| KR | 101547001 B1 | 8/2015 |

* cited by examiner

FLOW ACCELERATING VENTILATION TYPE HEAD COVER AND ENGINE THEREBY

CROSS-REFERENCE TO RELATED APPLICATION

The present application claims priority to Korean Patent Application No. 10-2016-0116418 filed on Sep. 9, 2016, the entire contents of which is incorporated herein for all purposes by this reference.

BACKGROUND OF THE INVENTION

Field of the Invention

The present invention relates to a head cover, and more particularly, to a head cover and an engine applying a flow accelerating type ventilation structure to reduce engine oil consumption by increasing efficiency of removing oil particle contained in blow-by gas.

Description of Related Art

Generally, an internal combustion engine is configured so that an upper portion thereof comprises a cylinder head coupled with a cylinder block forming combustion chamber, a camshaft and a valve opening/closing device are mounted in an interior space of the cylinder head, and an engine intake system and an engine exhaust system are respectively connected with both side portions of the cylinder head.

Particularly, the internal combustion engine further comprises a blow-by gas exhaust system, and the blow-by gas exhaust system collects oil particles to the cylinder head after filtering oil particles from blow-by gas being necessarily generated during combustion so as to transfer oil particles to a surge tank (or the intake system). Herein, the blow-by gas, which is gas not completely combusted in the combustion chamber and then flowed into a crank case of a lower portion of the cylinder block through a fine slit between a piston and a cylinder, contains main ingredient such as gas of hydrocarbon and carbon monoxide and oil particles of engine oil Therefore, the cylinder head is coupled with the head cover so as to block the interior space from an exterior, and the head cover provides a ventilation structure for blow-by gas. The ventilation structure is configured so that a rib structure, on which blow-by gas is impacted, is formed, and simultaneously, a blow-by gas passage, through which blow-by gas is flowed, is formed, and a baffle, to which an oil particle contained to blow-by gas is filtered, is disposed.

For example, blow-by gas containing exhaust gas and oil particles forms a gas flow route of rising from the cylinder block toward the head cover via the cylinder head, and the blow-by gas risen to the head cover is transformed to blow-by gas filtering oil particles by impacting on a gas inlet of the rib and the baffle of the head cover. Then, the blow-by gas filtering oil particles is flowed into the gas inlet of the baffle, and is passed through the blow-by gas passage, and is flowed out toward the surge tank (or the intake system). As a result, as the oil particles removed from blow-by gas is re-collected to an oil pan through the rib and the baffle of the head cover so as to be recycled, engine oil consumption can be reduced.

The above mentioned ventilation structure having a type of filtering an oil particle by impacting blow-by gas on an impact type baffle is referred to as called to impact type ventilation structure.

However, the impact type ventilation structure surely has low oil separation efficiency as removal of oil particle is completely depended on impact of blow-by gas.

As a result, engine oil consumption is increased by low oil separation efficiency, and the increase of engine oil consumption causes oil lack of the engine such that a cycle of replenishing engine oil should be short.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a flow accelerating ventilation type head cover and an engine having advantages of increasing engine oil recycling and decreasing engine oil consumption as efficiency of separating oil contained in blow-by gas is greatly increased by adding one impact effect by a flow accelerating member to two impact effects by a rib and a baffle and further adding collision effect of the flow accelerating member.

A flow accelerating ventilation type head cover according to an exemplary embodiment of the present invention may include: a baffle separating a lower space which is opened such that blow-by gas containing oil particle generated from an engine is collected thereto and an upper space which is closed such that the blow-by gas is flowed out to an outside of the engine and having a baffle passage communicating the lower space with the upper space such that the blow-by gas is exhausted from the lower space to the upper space therethrough; an impact guide being coupled with the baffle passage and being positioned in the lower space to separate the oil particle by impact effect of impacting thereon before the blow-by gas is flowed into the baffle passage; an impact rib protruded to the upper space to separate the oil particle by impact effect of impacting thereon before the blow-by gas is flowed out to an outside of the engine; and a flow accelerating member being coupled with the baffle passage and being positioned in the upper space to accelerate a flow speed of the blow-by gas passing through the baffle passage and thus separate the oil particle by collision effect of impacting the oil particle with each other in the upper space.

As a desirable exemplary embodiment, the flow accelerating member may comprise a nozzle to which a plurality of orifices are bored to accelerate the blow-by gas by the orifice and a media which is coupled with the upper space to be disposed apart from the nozzle and formed with a wire mesh generating the collision effect.

As a desirable exemplary embodiment, the impact guide may comprise a left guide and a right guide which cover a surround of the baffle passage and a right guide. The impact rib may be respectively formed in a front section, a center section, and a rear section partitioned an entire length of the upper space to be protruded with a different arrangement gap in respective sections.

As a desirable exemplary embodiment, the baffle may provide an oil outlet at an opposite side of the baffle passage and form an oil drain passage extended from the baffle passage to the oil outlet and formed in a hopper shape at the oil outlet.

As a desirable exemplary embodiment, the lower space may be formed by a lower end cover, the upper space may be formed by an upper end cover, and the baffle may be positioned as a portion coupling the lower end cover with the upper end cover which are coupled by a bolting member and be fixed by a boss protruded from the upper end cover to separate the upper space and the lower space. An outlet nipple to function as a passage through which the blow-by gas is flowed out to an outside of the engine may be provided to the upper end cover.

Furthermore, an engine according to an exemplary embodiment of the present invention may include: a cylinder block in which combustion is performed; a cylinder head being coupled with an upper portion of the cylinder block such that and blow-by gas containing an oil particle generated from the engine is collected therein; an oil pan being coupled with a lower portion of the cylinder block such that an oil particle removed from the blow-by gas is collected therein; and a head cover being coupled with the cylinder head and having an impact guide and an impact rib against which blow-by gas containing an oil particle generated by combustion is impacted and a flow accelerating member against which the oil particle collides and is removed from the blow-by gas.

As a desirable exemplary embodiment, the head cover may comprise a lower end cover formed with an edge frame forming both side open spaces, an upper end cover formed with an edge frame forming one side open space to be coupled with the lower end cover by a bolting member, a baffle positioned as a coupling portion of the lower end cover and the upper end cover to separate an internal space to a lower space of the lower end cover and an upper space of the upper end cover, an impact guide surrounding a baffle passage of the baffle to generate impact effect by impacting blow-by gas thereon, impact rib formed at a bottom surface of the upper end cover to generate impact effect by impacting blow-by gas being flowed out through an outlet nipple thereon, a nozzle accelerating blow-by gas passing through the baffle passage of the baffle, and a media generating collision effect by impacting blow-by gas flowed out via the nozzle with each other.

The engine according to an exemplary embodiment of the present invention includes a head cover applying a flow accelerating type ventilation structure such that oil separating efficiency greatly increased by combination of an impact guide, an impact rib and a flow accelerating member in comparison with an ordinary impact type ventilation structure, and action and effect thereof realizes advantages below.

Firstly, engine oil collecting may be increased and engine oil consumption may be decreased by the increased oil separating efficiency. Secondly, as collision effect increasing oil separating efficiency is realized depending on acceleration of a blow-by gas flow speed by using a nozzle, performance of a ventilation structure is improved, concurrently, production cost is maintained with a same level in comparison with an ordinary impact type ventilation structure, and low price of a head cover applying a ventilation structure is actualized. Thirdly, as collision effect is increased by a wire mesh type media positioned on a flow route blow-by gas passing through a nozzle, oil drain using a baffle is to be easy. Fourthly, oil separating efficiency may be further increased by only increasing impact effect depending on simple structure alterations to change rib arrangement of a head cover and mount an inlet guide of a baffle. Fifthly, as blow-by gas which does not contain an oil particle is re-supplied to an engine by oil separating efficiency, combustion performance may be improved and generation of harmful materials may be reduced. Sixthly, the terms desired about engine oil, which is required to a next generation engine improving performance in comparison with an ordinary engine, may be satisfied by the increased oil separating efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
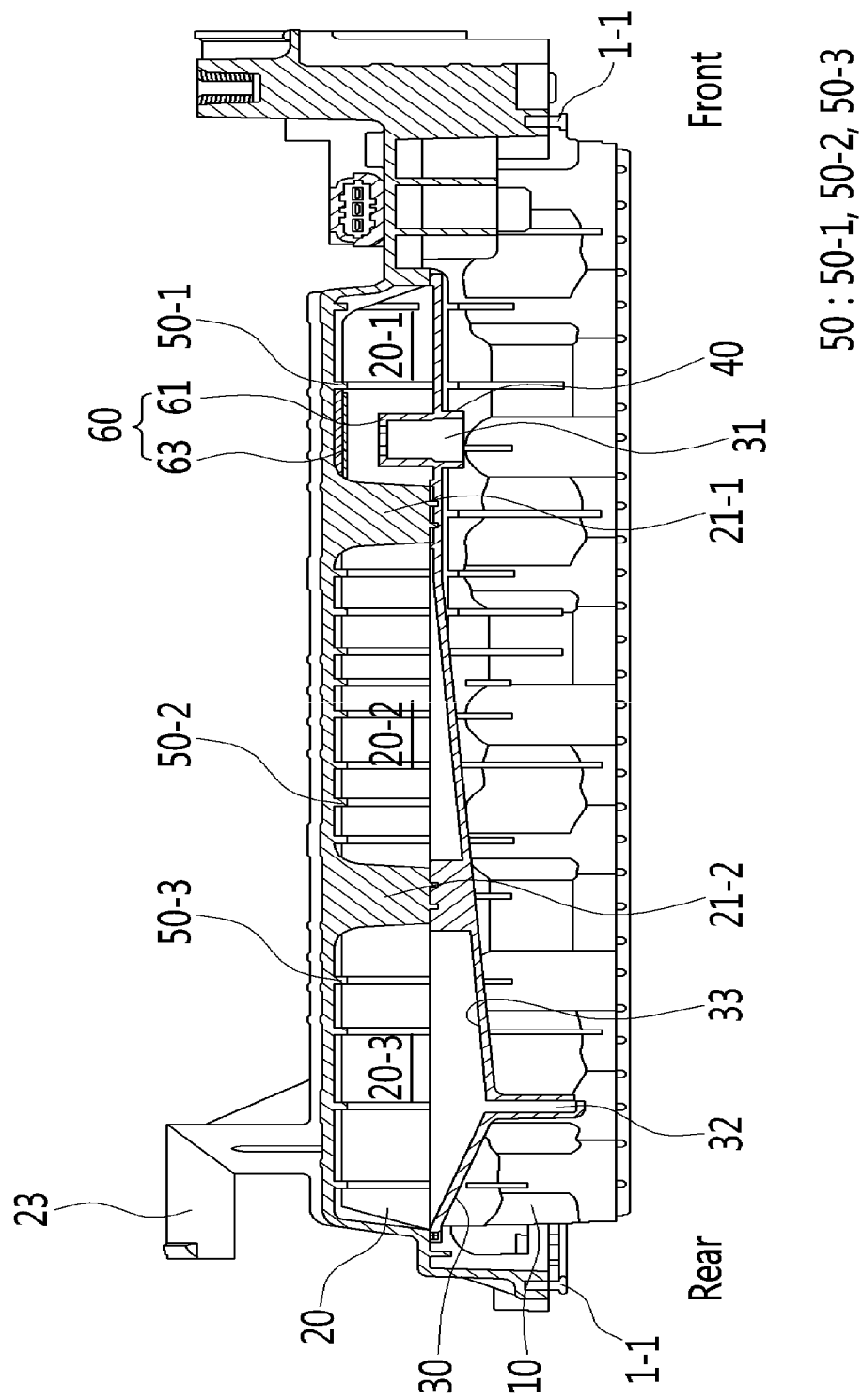
FIG. 1 is a schematic diagram a head cover applying a flow accelerating type ventilation structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a head cover 1 includes a lower end cover 10, an upper end cover 20, a baffle 30, an impact guide 40, an impact rib 50, and a flow accelerating member 60, and forms an internal space separated to a lower space and an upper space by the baffle 30 such that blow-by gas being generated from an engine and then being risen is collected therein.

Concretely, the lower end cover 10 and the upper end cover 20 are coupled by a bolting member 1-1 to form the internal space in which one surface (i.e. a surface coupled with a cylinder block) is opened. The lower end cover 10 is formed with a side edge portion to form both side open spaces. The upper end cover 20 is formed with a bottom surface to form one side open space, and is configured so that the internal space is separated to a front section 20-1, a center section 20-2, and a rear section 20-3, and a front boss 21-1 to which a baffle 30 is coupled is protruded in a boundary portion between the front section 20-1 and the center section 20-2, and a rear boss 21-2 to which the baffle 30 is coupled is protruded in a boundary portion between the center section 20-2 and the rear section 20-3, and an outlet nipple 23 through which blow-by gas is flowed out is formed at the rear section 20-3. The front section 20-1 forms a baffle room which is provided as a place for positioning a baffle passage 31 of the baffle 30 and coupling the flow accelerating member 60.

Concretely, the baffle 30 forms an oil drain passage 33 in which the baffle passage 31 and the oil outlet 32 are disposed at both end portions and separates the internal space of the head cover 1 to the internal of the lower end cover 10 and the internal of the upper end cover 20 by being positioned as a coupling portion of the lower end cover 10 and the upper end cover 20. The baffle passage 31 is formed in a quadrangle shape or a rectangle shape, and the oil outlet 32 is formed with a tube or a pipe, and the oil drain passage 33 is formed in a hopper shape at the oil outlet 32 to easily exhaust oil collected.

Concretely, the impact guide 40 covers a front direction and a rear direction of the baffle passage 31 in a lower surface portion (i.e. an opposite surface of an upper surface portion at which the oil drain passage 33 is formed) of the baffle 30. In the instant case, when a front side of an engine is defined to a front and a rear side of an engine is defined to a rear, the front direction of the baffle passage 31 represents the front side of the engine and the rear direction of the baffle passage 31 represents the rear side of the engine. The impact rib 50 is protruded with a predetermined height from a bottom surface of the upper end cover 20 to be formed at the front section 20-1, the center section 20-2, and the rear section 20-3.

Concretely, the flow accelerating member 60 includes a nozzle 61 and a media 63, and the nozzle 61 accelerates a flow speed of blow-by gas being flowed out through the baffle passage 31 on a state of surrounding a circumference of the baffle passage 31 in the upper surface portion (i.e. an opposite surface of the lower surface portion at which the impact guide 40 is disposed) of the baffle 30. The media 63 is coupled with a bottom surface of the front section 20-1 of the upper end cover 20 such that a flow route of blow-by gas is varied after impacting thereto by an accelerated flow speed and thus is disposed to face the nozzle 61 on a state of being positioned apart from the nozzle 61.

Figure 2:
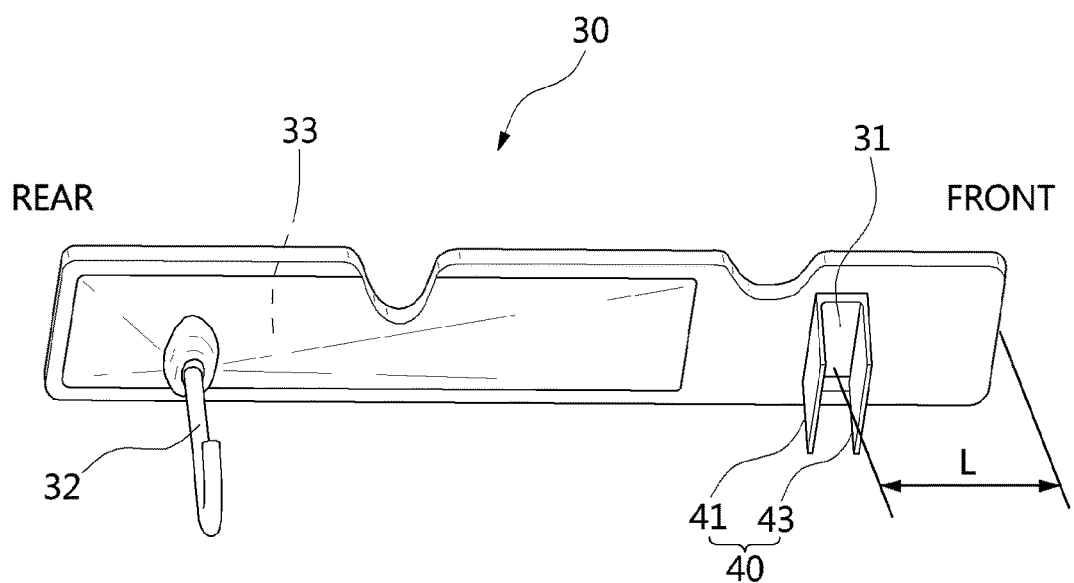
FIG. 2 is a detailed structure of an impact guide of a baffle according to an exemplary embodiment of the present invention.
Figure 3:
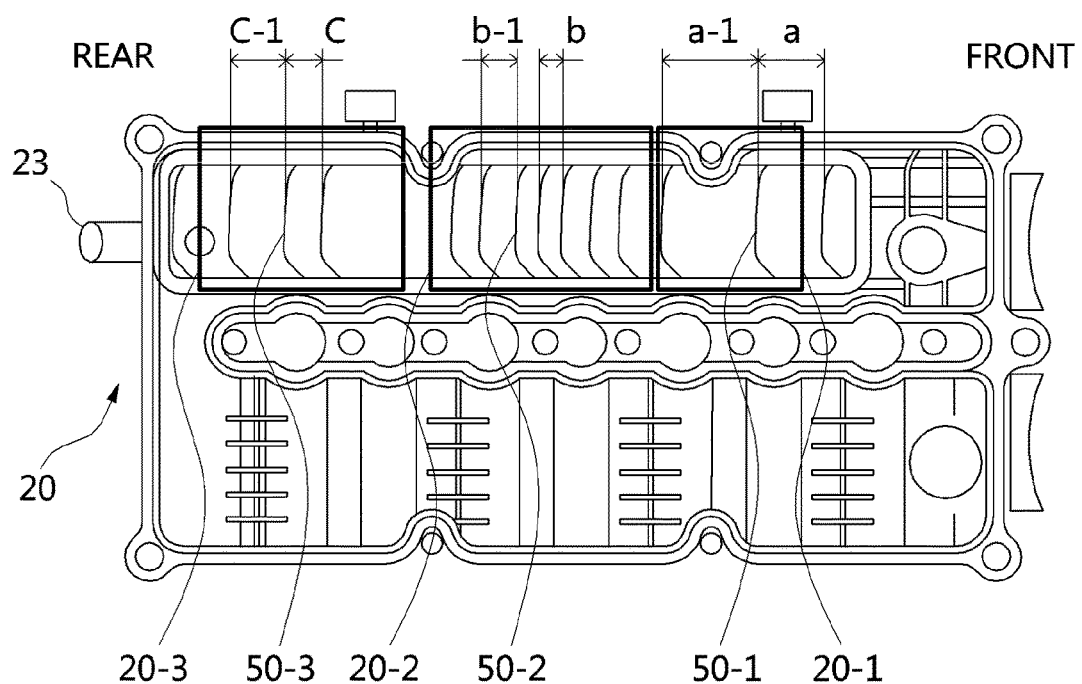
FIG. 3 is a detailed structure of an impact rib according to an exemplary embodiment of the present invention.
Figure 4:
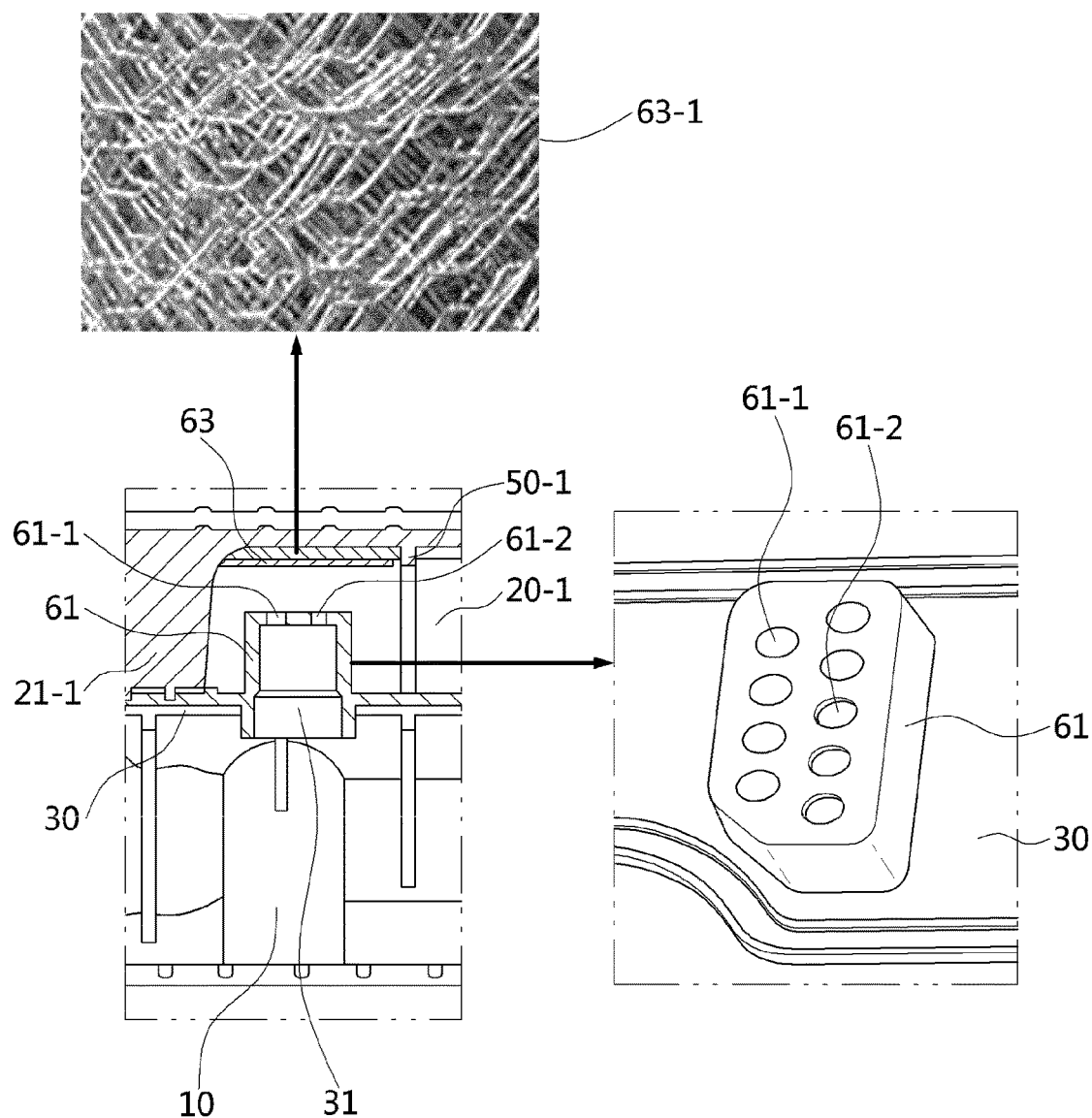
FIG. 4 is a detailed structure of a flow accelerating member according to an exemplary embodiment of the present invention.

Meanwhile, FIG. 2 to FIG. 4 respectively represent detailed compositions of the impact guide 40, the impact rib 50, the nozzle 61, and the media 63.

Referring to FIG. 2, the impact guide 40 includes left and right guides 41 and 43 which are formed in a rectangle plate shape, and the left guide 41 covers a front side portion of the baffle passage 31 and the right guide 43 covers a rear side portion of the baffle passage 31. As the left and right guides 41 and 43 have an equal height about 15 mm, it is prevented that flying oil which is generated by a cam is directly flowed into the baffle passage 31. Therefore, the left and right guide 41 and 43 is mounted to front and rear surfaces of four surfaces of the baffle passage 31 to be corresponded with a flow direction of blow-by gas so that separation of oil particle is maximized by impacting blow-by gas thereon, and blow-by gas can be easily flowed into the baffle passage 31 as two surfaces besides front and rear surfaces of the four surfaces is not covered.

Mounting positions L, to which the left and right guides 41 and 43 are mounted, are positioned to be adjacent to a front direction of the baffle 30, and in addition, are predetermined in a distance whereby oil particles of blow-by gas passing through the baffle passage 31 can be filtered about 90%. Therefore, the mounting positions L is optimized by experiments.

Referring to FIG. 3, the impact rib 50 is divided to a front rib 50-1 which is protruded as a predetermined height at the front section 20-1 of the upper end cover 20, a center rib 50-2 which is protruded as a predetermined height at the center section 20-2 of the upper end cover 20, and a rear rib 50-3 which is protruded as a predetermined height at the rear section 20-3 of the upper end cover 20. The respective front rib 50-1, center rib 50-2, and rear rib 50-3 are arranged by combining a plurality of ribs, and in addition, arrangement gaps are different from each other.

For example, the front rib 50-1 is configured so that gaps between two ribs which neighbor on each other are formed with a first gap a and a second gap a-1, and the center rib 50-2 is configured so that gaps between two ribs which neighbor on each other are formed with a third gap b and a fourth gap b-1, and the rear rib 50-3 is configured so that gaps between two ribs which neighbor on each other are formed with a fifth gap c and a sixth gap c-1. In the instant case, the third and fourth gaps b and b-1 of the center rib 50-2 is formed to be shorter than the first and second gaps a and a-1 of the front rib 50-1 and the fifth and sixth gaps c and c-1 of the rear rib 50-3 to make dense rib arrangements. As a result, the front rib 50-1 and the rear rib 50-3 are configured so that exhaust of blow-by gas is to be easy by minimizing the number of ribs, whereas the center rib 50-2 is configured so that the number of ribs, on which blow-by gas is impacted, is great to improve oil particle separating efficiency.

Referring to FIG. 4, the nozzle 61 is formed with a nozzle body having a predetermined height to surround the baffle passage 31 by an one direction open type internal space, and the nozzle 61 forms an orifice which is a circular hole such that blow-by gas flowed into the internal space accelerates. The orifice includes a left orifice row 6-1 which is bored to a left side portion of the nozzle body and right orifice row 6-2 which is bored to a right side portion of the nozzle body to be formed at the nozzle body. The media 63 is formed with a wire mesh 63-1, and oil particle separating efficiency can be further improved as blow-by gas which accelerates by passing through the left and right orifice rows 6-1 and 6-2 is impacted on the wire mesh 63-1. In the instant case, the separated oil particle becomes to oil by getting together to be flowed toward the oil outlet 32 along the oil drain passage 33 of the baffle 30.

Figure 5:
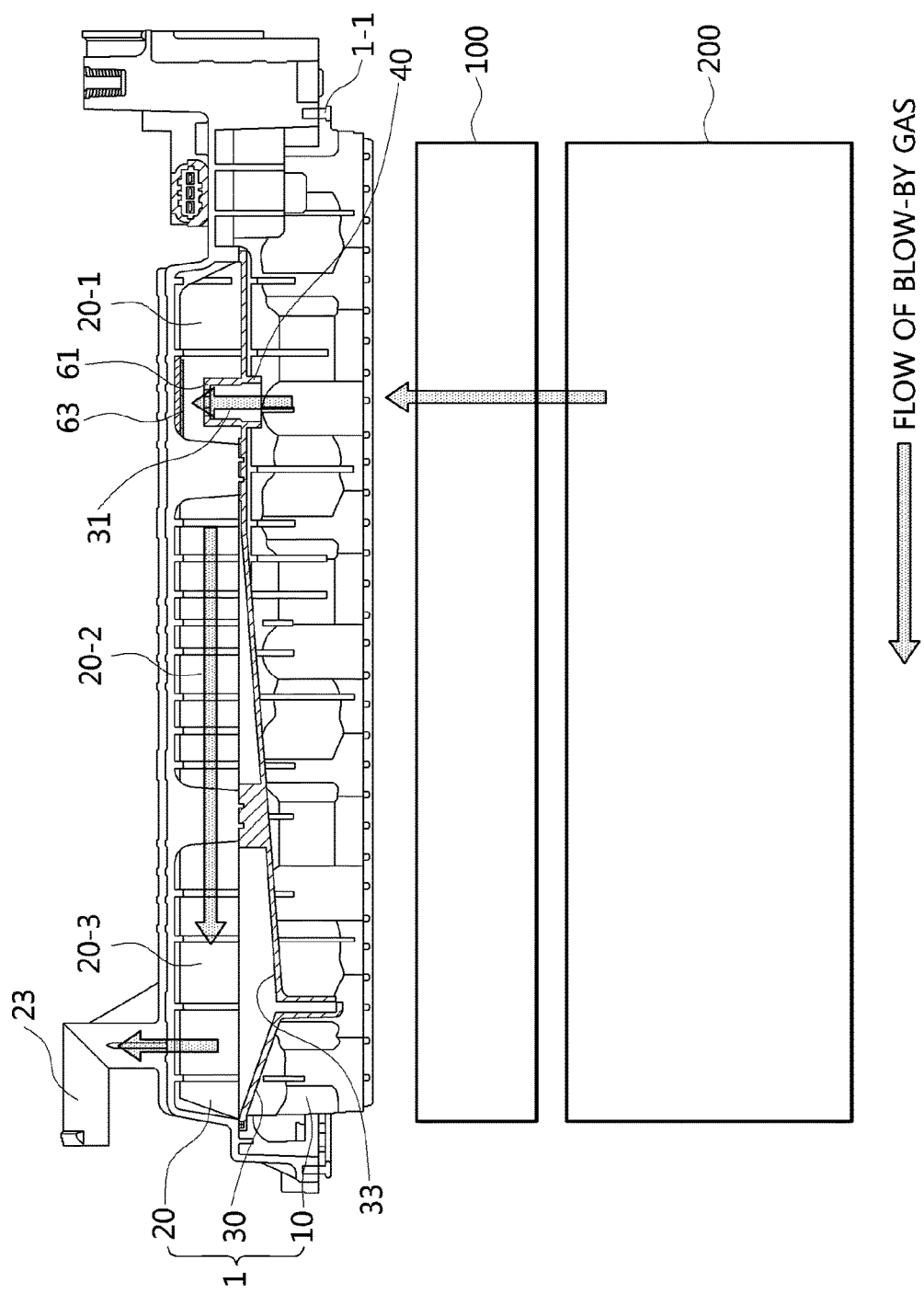
FIG. 5 is a state of exhausting blow-by gas through a flow accelerating type ventilation structure in an engine applying a head cover according to an exemplary embodiment of the present invention.

Meanwhile, FIG. 5 shows an example of an engine that blow-by gas is exhausted.

As shown, the engine is configured so that the cylinder head 100 and the head cover 1 are provided as an upper portion of the cylinder block 200 in which combustion is performed and the oil pan 300 (referring to FIG. 7) in which engine oil is charged is provided as a lower portion of the cylinder block 200.

Concretely, the head cover 1 is same to the head cover 1 described referring to FIG. 1 to FIG. 4. Therefore, the ventilation structure of the head cover 1 is formed with the lower/upper end covers 10 and 20, the baffle 30, the baffle passage 31, the nozzle 61, and the outlet nipple 23, and the oil separation structure thereof is formed with the impact guide 40, the impact rib 50, the media 63, the oil outlet 32, and the oil drain passage 33.

Blow-by gas generated from the engine is collected to the head cover 1 in the cylinder head 100 after being risen from the cylinder block 200 toward the cylinder head 100. Thus, the ventilation structure of the head cover 1 forms a flow route of blow-by gas that blow-by gas flowed from the lower end cover 10 into the baffle passage 31 is accelerated by the nozzle 61 to be transferred to the upper end cover 20 and then is flowed out to the outlet nipple 23 via the front/center/rear sections 20-1, 20-2, and 20-3. Simultaneously, the oil separation structure of the head cover 1 separates oil particles by impact effect to impact the impact guide 40 and blow-by gas, impact effect to impact the impact rib 50 and blow-by gas, and collision effect to impact the media 63 and accelerated blow-by gas.

As a result, the blow-by gas is transformed to gas removing oil particles and then is exhausted, and oil particles removed from the blow-by gas is collected as engine oil and then is recycled in the engine. In the instant case, it is proved that oil separating efficiency reaches 95% as an experiment.

Figure 6:
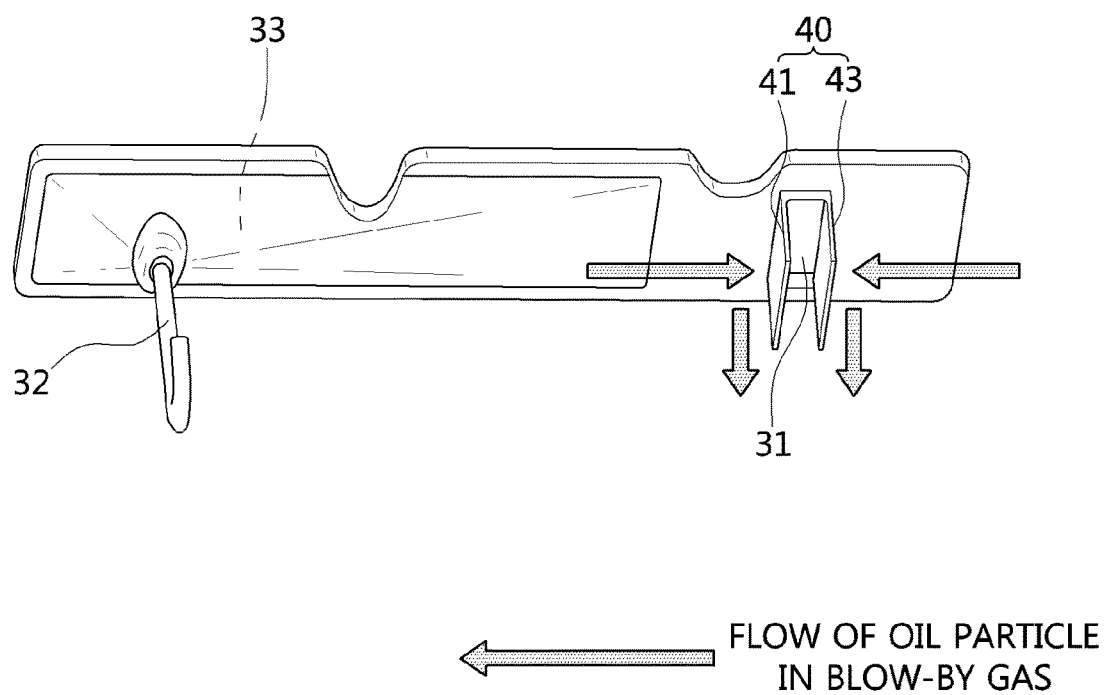
FIG. 6 is a state of separating oil by an impact baffle and an impact rib according to an exemplary embodiment of the present invention.
Figure 7:
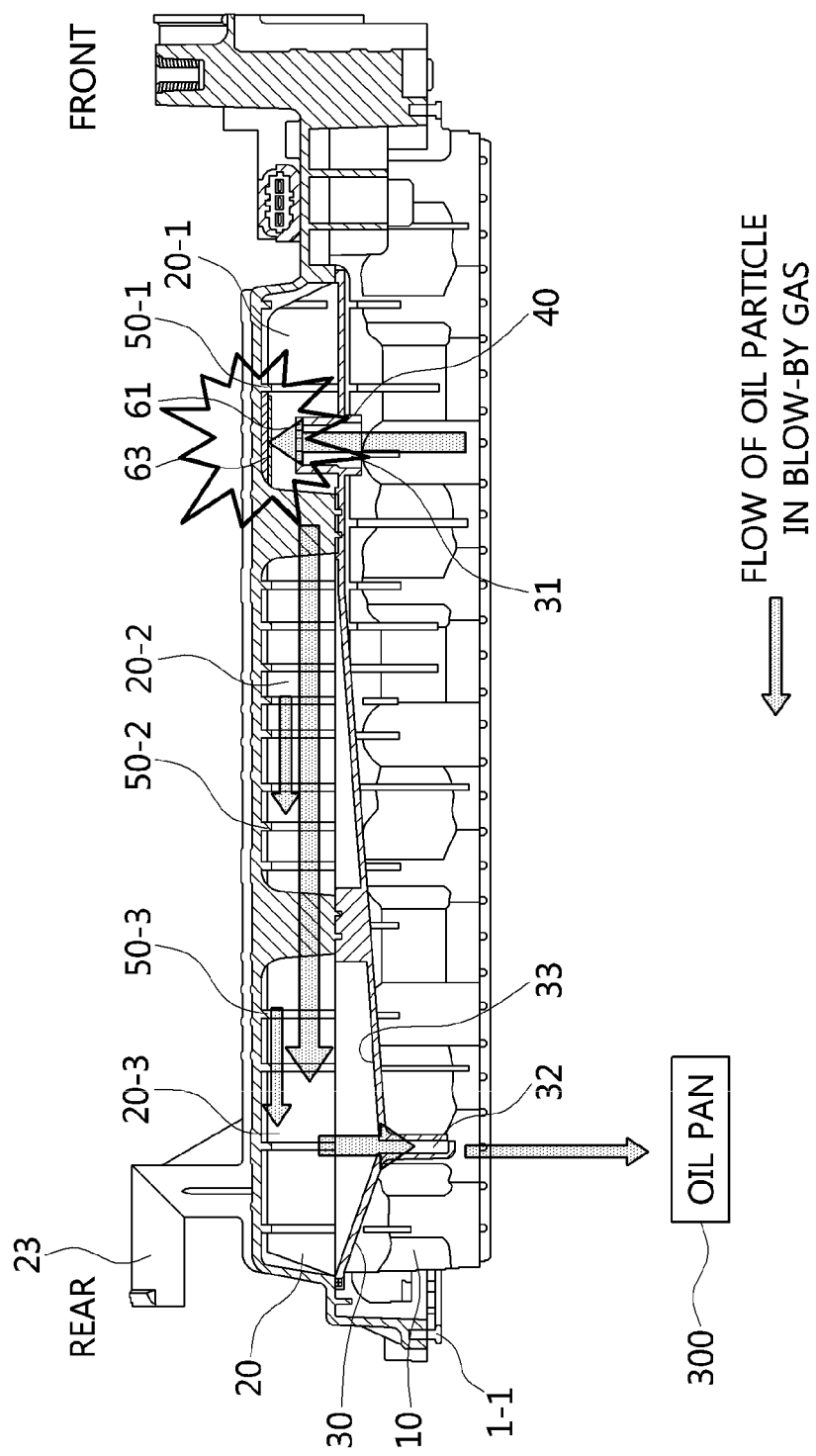
FIG. 7 is a state of draining oil to an oil pan after separating oil by a flow accelerating member according to an exemplary embodiment of the present invention.

Meanwhile, FIG. 6 and FIG. 7 respectively show each example about oil particle separation action of the impact guide 40, the impact rib 50, and the media 63.

Referring to FIG. 6, the left and right guides 41 and 43 of the impact guide 40 generate impact effect by acting such that blow-by gas flowed along a lower surface portion of the baffle 30 is impacted thereon before being flowed into the baffle passage 31. As a result, as the impact effect removes oil particles from blow-by gas, blow-by gas is transformed to the first oil removal blow-by gas in the internal space of the lower end cover 10. In the instant case, the oil particles removed from blow-by gas becomes to oil by getting together to be collected to the oil pan 300.

Referring to FIG. 7, the wire mesh 63-1 of the media 63 generates collision effect by acting such that the first oil removal blow-by gas accelerated by passing through the left and right orifice rows 6-1 and 6-2 of the nozzle 61 via the baffle passage 31 is impacted thereon before being flowed to the upper end cover 20. As a result, as the collision effect once more removes oil particles from the first oil removal blow-by gas, the first oil removal blow-by gas is transformed to the second oil removal blow-by gas in the front section 20-1 (i.e. baffle room) of the upper end cover 20. In the instant case, the oil particles removed from the first oil removal blow-by gas becomes to oil by getting together to be flowed toward the oil outlet 32 along the oil drain passage 33 of the baffle 30 and then be collected to the oil pan 300.

The impact rib 50 generates impact effect by acting such that the second oil removal blow-by gas sequentially flowed via the front/center/rear sections 20-1, 20-2, and 20-3 of the upper end cover 20 is impacted thereon before being exhausted through the outlet nipple 23 as a direction thereof is changed after impacting on the media 63. As a result, as the impact effect once more removes oil particles from the second oil removal blow-by gas, the second oil removal blow-by gas is transformed to the third oil removal blow-by gas in the internal space of the upper end cover 20 to be flowed out through the outlet nipple 23. In the instant case, the oil particles removed from the second oil removal blow-by gas becomes to oil by getting together to be flowed toward the oil outlet 32 along the oil drain passage 33 of the baffle 30 and then be collected to the oil pan 300.

As mentioned above, as oil particles are removed three times from blow-by gas by the action of the impact guide 40, the media 63, and the impact rib 50, it is proved that there is oil separating efficiency about 95% as an experiment.

As described above, the flow accelerating ventilation type head cover according to the present exemplary embodiment includes a ventilation structure formed with lower/upper end covers 10 and 20, a baffle 30, and a nozzle 61, and an oil separation structure formed an impact guide 40 and an impact rib 50 generating impact effect and a media 63 generating collision effect, and separates an oil particle contained in blow-by gas by an impact guide, an impact rib and a flow accelerating member as it is applied to an engine together with a cylinder head 100. As a result, engine oil consumption is greatly decreased by increasing engine oil recycling depending on oil separating efficiency which reaches about 95% before blow-by gas is exhausted from an engine to an outside.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flow accelerating ventilation type head cover comprising:
    a baffle separating a lower space which is open, wherein blow-by gas containing an oil particle generated from an engine is collected thereto and an upper space which is closed, wherein the blow-by gas is flowed out to an outside of the engine and having a baffle passage communicating the lower space with the upper space, wherein the blow-by gas is exhausted from the lower space to the upper space therethrough; and
    a flow accelerating member being coupled with the baffle passage and being positioned in the upper space to accelerate a flow speed of the blow-by gas passing through the baffle passage and thus separate the oil particle by collision effect of impacting the oil particle with each other in the upper space,
    wherein the lower space is formed by a lower end cover, the upper space is formed by an upper end cover, and the baffle is positioned as a portion coupling the lower end cover with the upper end cover to separate the upper space and the lower space, and
    wherein the lower end cover and the upper end cover are coupled by a bolting member and the baffle is coupled by a boss protruded from the upper end cover.

2. The flow accelerating ventilation type head cover of claim 1, wherein the flow accelerating member includes a nozzle accelerating the blow-by gas including an orifice and a media being coupled with the upper space, disposed apart from the nozzle to generate the collision effect.

3. The flow accelerating ventilation type head cover of claim 2, wherein an oil particle separated by the collision effect of the media is configured to be collected with the baffle.

4. The flow accelerating ventilation type head cover of claim 2, wherein the nozzle includes a plurality of orifices.

5. The flow accelerating ventilation type head cover of claim 2, wherein the media is formed with a wire mesh.

6. The flow accelerating ventilation type head cover of claim 1, further including an impact guide being coupled with the baffle passage and being positioned in the lower space to separate the oil particle by impact effect of impacting thereon before the blow-by gas is flowed into the baffle passage.

7. The flow accelerating ventilation type head cover of claim 6, wherein the impact guide includes a first guide and a second guide which cover a surrounding of the baffle passage.

8. The flow accelerating ventilation type head cover of claim 1, further including an impact rib protruded to the upper space to separate the oil particle by impact effect of impacting thereon before the blow-by gas is flowed out to an outside of the engine.

9. The flow accelerating ventilation type head cover of claim 8, wherein the impact rib is respectively formed in a front section, a center section, and a rear section partitioned an entire length of the upper space and arrangements of the impact rib are densely formed in the center section in comparison with the front section and the rear section.

10. The flow accelerating ventilation type head cover of claim 1, wherein the baffle provides an oil outlet at an opposite side of the baffle passage and forms an oil drain passage extended from the baffle passage to the oil outlet.

11. The flow accelerating ventilation type head cover of claim 10, wherein the oil drain passage is formed in a hopper shape at the oil outlet.

12. The flow accelerating ventilation type head cover of claim 1, wherein the upper end cover provides an outlet nipple and the outlet nipple is a passage through which the blow-by gas is flowed out to an outside of the engine.

13. An engine comprising the head cover of claim 1, wherein the head cover includes:
    an impact guide and an impact rib against which the blow-by gas containing the oil particle generated by combustion is impacted; and
    the flow accelerating member against which the oil particle collides and is removed from the blow-by gas.

14. The engine of claim 13, further including:
    a cylinder head being coupled with the head cover and collecting the blow-by gas containing the oil particle;
    a cylinder block wherein combustion is performed therein and the cylinder head is coupled to an upper portion thereof; and
    an oil pan being coupled with a lower portion of the cylinder block, wherein the oil particle removed from the blow-by gas is collected therein.

* * * * *